May 18, 1926.
W. SUDEKUM
METALLIC PACKING
Filed Jan. 27, 1925　　2 Sheets-Sheet 2
1,585,433
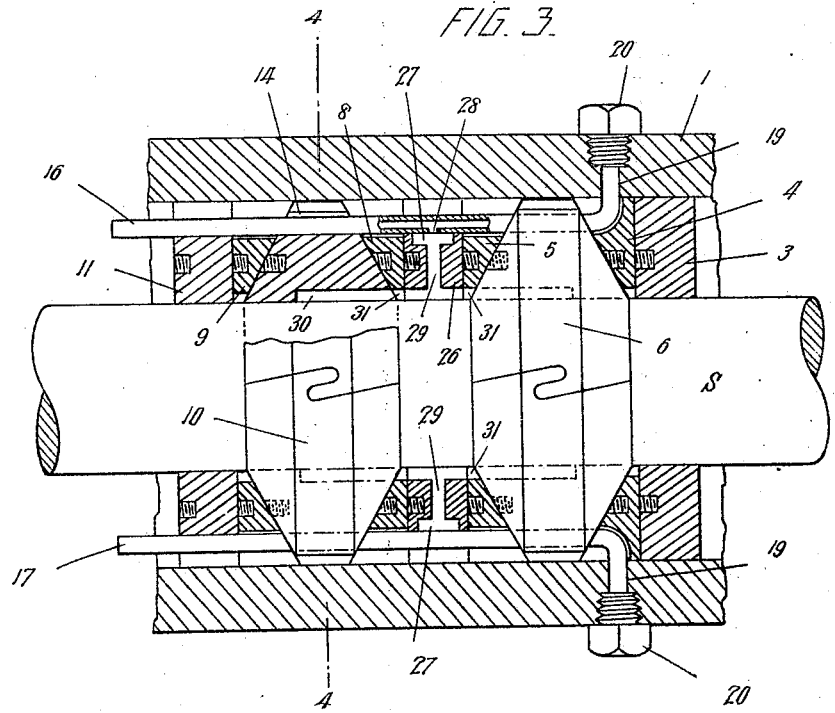
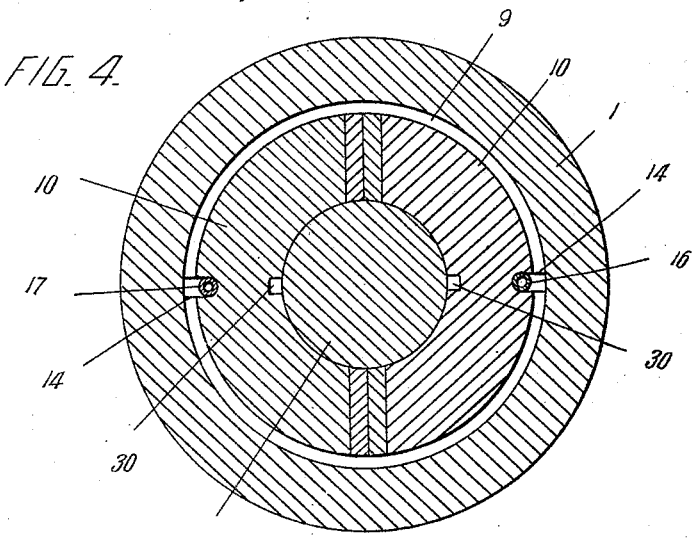
Inventor
William Sudekum
By Ogle R. Singleton
Attorney Patented May 18, 1926.

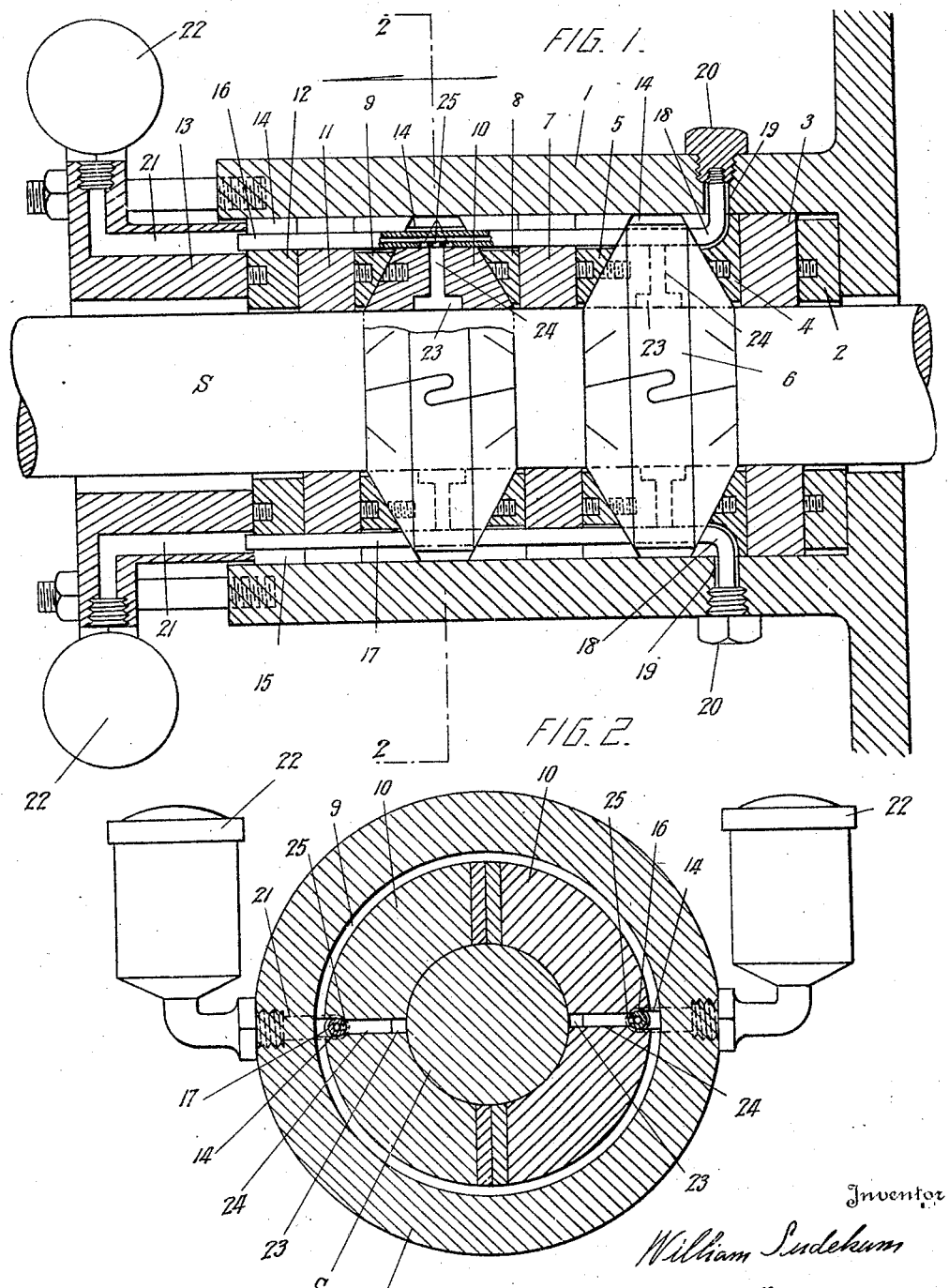

1,585,433

UNITED STATES PATENT OFFICE.

WILLIAM SUDEKUM, OF NASHVILLE, TENNESSEE.

METALLIC PACKING.

Application filed January 27, 1925. Serial No. 5,096.

My invention consists in a new and useful improvement in metallic packing and is designed to provide means for packing rotary shafts, in which the packing elements are provided with lubricating means serving also the purpose of keys to retain the packing elements in proper position in the stuffing box.

While I have illustrated in the drawings filed herewith specific embodiments of my invention, it is to be distinctly understood that I do not consider my invention limited to the details of construction therein disclosed, but refer for its scope to the claims appended hereto.

In the drawings:

Fig. 1 is a horizontal section of a stuffing box provided with my invention.

Fig. 2 is a vertical section on line 2—2 of Fig. 1.

Fig. 3 is a view similar to Fig. 1 of a modified form.

Fig. 4 is a vertical section on line 4—4 of Fig. 3.

In the drawings, the numeral 1 designates a stuffing box in which my improved packing is received. I provide a retaining ring 2 of soft metal, surrounding the shaft S and seated against the inner end of the box 1. I next provide a rubber ring 3. I then provide two packing rings 4 and 5 having opposed sloping faces and between these rings 4 and 5 I place a packing ring 6 having sloping faces complementary to the faces of the rings 4 and 5. The rings 4 and 5 are spaced from the shaft S and the ring 6 fitted to the shaft S is spaced from the inner face of the stuffing box 1. Adjacent the ring 5, I place a second rubber ring 7. I then place three packing rings 8, 9 and 10, duplicating the rings 4, 5 and 6 respectively. Adjacent the ring 9, I place a third rubber ring 11 and outside this ring 11, I position a second retaining ring 12 of soft metal. The rings are retained in the box 1 by a packing gland 13 of the usual type. In the rings 4, 5, 6, 7, 8, 9, 10, 11 and 12, I provide transverse grooves 14 and 15 in which are received the lubricating pipes 16 and 17 which are provided at their inner ends with bends 18 permitting the pipes 16 and 17 to extend into bores 19 in the walls of the box 1. Caps 20 screwed into the bores 19 and closing the ends of the pipes 16 and 17 may be provided, or, if desired, lubricating cups may be attached to the ends of the pipes 16 and 17 through the bores 19. The outer ends of the pipes 16 and 17 are received in channels 21 in the gland 13, lubricating cups being connected therewith.

Each of the packing rings 6 and 10 is provided with an interior groove 23 communicating with its exterior grooves 14 and 15 by channels 24. The pipes 16 and 17 are provided with a series of holes 25 so positioned as to register with the channels 24 in the rings 6 and 10 when the parts are assembled.

The method of assembling the parts of my device will be readily apparent. After rings 3 and 4 have been positioned, the lubricating pipes 16 and 17 are positioned and then the rings 4, 5, 6, 7, 8, 9, 10, 11 and 12 are slid into position, the pipes 16 and 17 guiding them, and the whole structure is retained in the box 1 by the gland 13. It will thus be obvious that the pipes 16 and 17 serve the double use of supplying lubricant to the packing rings 6 and 10 and retaining the rings 4, 5, 6, 7, 8, 9, 10, 11 and 12 against displacement by reason of the rotation of the shaft S.

In the modified form of my device illustrated in Figs. 3 and 4, I provide in the place of the rubber ring 7 an oil lantern 26 having an exterior groove 27 in communication with the pipes 16 and 17 through the holes 28 therein, and a channel 29 communicating with the inner face of the lantern 26 spaced from the shaft S. When the oil lantern 26 is used, the packing rings 6 and 10 are provided with grooves 30 in their inner faces in communication with the grooves 31 in the rings 5 and 8 which afford communication with the space between the inner face of the oil lantern 26 and the shaft S.

Having described my invention, what I claim is:

1. In shaft stuffing box packing, the combination of a plurality of packing rings, each provided with a longitudinal groove in its outer face, said grooves being in registry to form a continuous groove; an oiling ring interposed between two of said rings; a continuous lubricating pipe received in said continuous groove and provided with an oil port registering with said oiling ring.

2. In shaft stuffing box packing, the combination with a stuffing box having a transverse bore and a channeled packing gland, of packing elements each having a groove in its outer face in registry with each of the others forming a continuous groove; an oiling element interposed between two of the packing elements; and a continuous lubricating pipe connected with the stuffing box bore and the packing gland channel and having an opening registering with the oiling element.

In testimony whereof I affix my signature.

WILLIAM SUDEKUM.